United States Patent [19]

Hobson, Sr.

[11] Patent Number: 4,688,729

[45] Date of Patent: Aug. 25, 1987

[54] BALED MULCH APPLICATOR

[76] Inventor: Joseph H. Hobson, Sr., Rte. 1, Box 610, Ontario, Oreg. 97914

[21] Appl. No.: 740,961

[22] Filed: Jun. 4, 1985

[51] Int. Cl.$^4$ .................. B02C 18/06; B02C 18/20
[52] U.S. Cl. .................. 241/101.7; 241/186 R; 241/223; 241/285 R; 241/287
[58] Field of Search ........... 241/101.7, 186 R, 223, 241/285 R, 285 A, 285 B

[56] References Cited

U.S. PATENT DOCUMENTS

| | | |
|---|---|---|
| 2,685,900 | 8/1954 | Cross . |
| 2,740,247 | 4/1956 | Worrell . |
| 3,015,188 | 1/1962 | Reinecker et al. . |
| 3,129,739 | 4/1964 | Wenger . |
| 3,229,984 | 1/1966 | McLeland . |
| 3,722,802 | 3/1973 | Krelenbaum . |
| 3,926,378 | 12/1975 | Ryan . |
| 3,999,674 | 12/1976 | Meitl . |
| 4,037,740 | 7/1977 | Wood et al. . |
| 4,083,501 | 4/1978 | Ryan . |
| 4,170,426 | 10/1979 | White et al. . |
| 4,335,855 | 6/1982 | Staskal et al. . |

Primary Examiner—Timothy V. Eley
Attorney, Agent, or Firm—Seed and Berry

[57] ABSTRACT

A baled mulch applicator for the uniform application of baled mulch material from bales to a plurality of furrows between rows of soil on cultivated land to control soil erosion and increase crop yield. The apparatus has a plurality of bale chambers dapted to accept bales which are advanced in the bale chambers towards a plurality of beaters on a single rotating shaft. The beaters break up and distribute the material through a deflector hood to the furrows. The individual bale chambers are spaced apart a distance which corresponds to the distance between the furrows.

10 Claims, 7 Drawing Figures

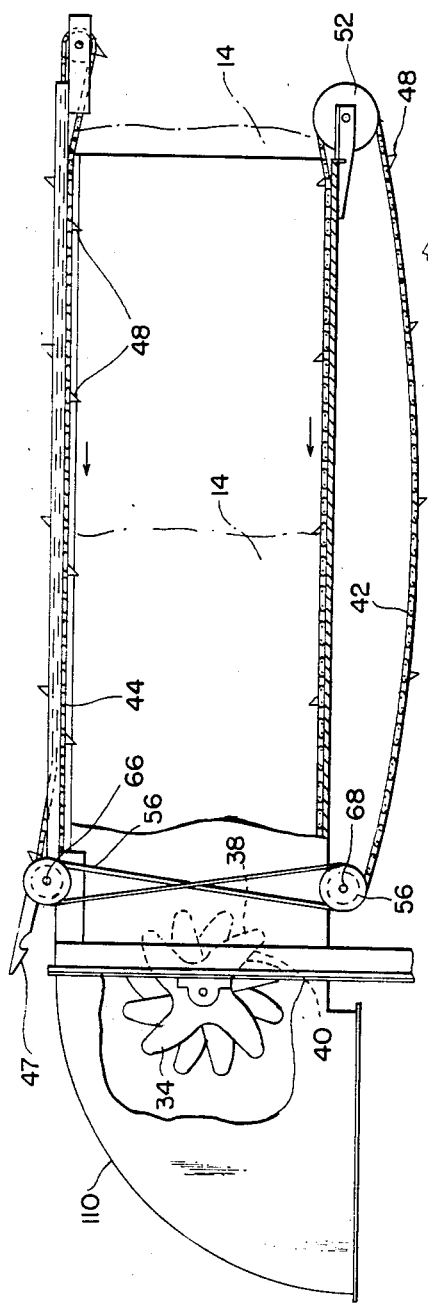
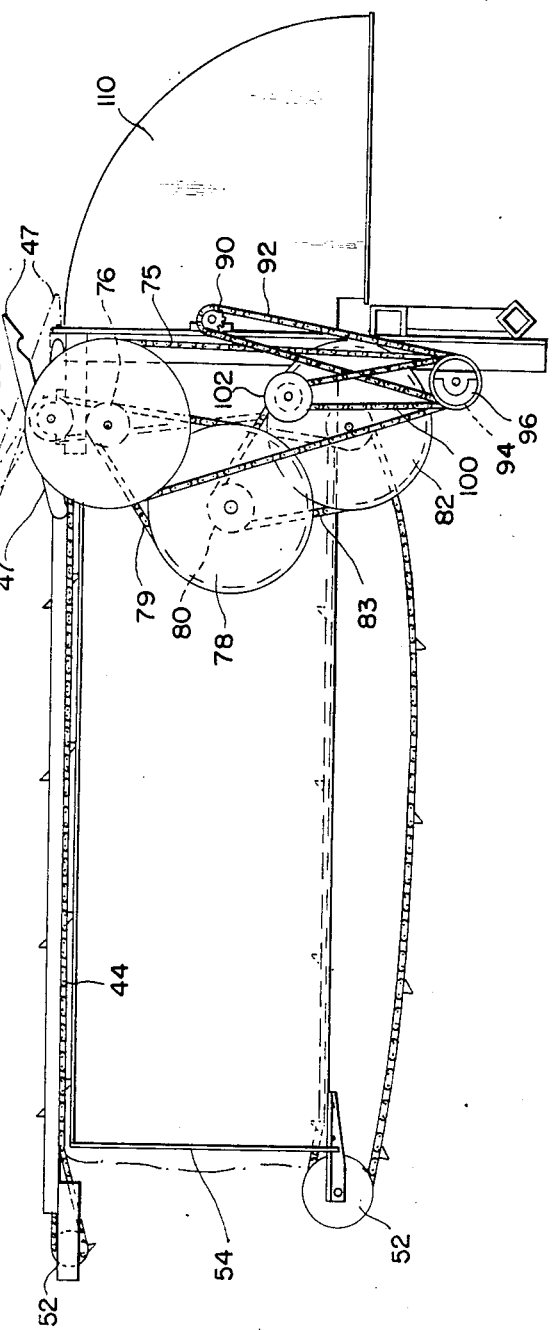

BALED MULCH APPLICATOR

DESCRIPTION

1. Technical Field

The invention relates to an apparatus for the application of baled mulch material to furrows between rows of soil on cultivated land to control soil erosion and to reduce runoff from the land thereby increasing crop yield. More specifically, the invention relates to an apparatus for the uniform application of baled mulch material from bales to a plurality of furrows between rows of growing plants on cultivated land.

2. Background of The Art

It is well known that the application of a variety of waste materials, such as straw, hay, grass or other types of mulch, when applied to the furrows between rows of soil on cultivated land significantly reduces the velocity of water traveling in the furrows. By reducing the velocity of water runoff, the amount of particulate matter deposited from farms into streams, commonly known as "silting," can be controlled. The mulch material acts as a filter to retain soil particles, fertilizer and pesticides which have been suspended in runoff water and prevents these items from flowing into nearby streams. Additionally, because the mulch material decreases the velocity of water flowing in the furrows, the disassociation of soil particles from the land is reduced.

As disclosed by Miller et al. in "Residue Management to Reduce Furrow Erosion," *Journal of Soil and Water Conservation*, Vol. 38, No. 4, p. 366, 1983, small amounts of residue can effectively reduce soil erosion and increase crop yield. Limited tillage can then be used to prepare a seed bed and incorporate herbicides. Sufficient residue will remain in the furrow to control erosion. It is, however, preferred that a uniform layer of material be deposited in the furrow and that only a minimum amount of material necessary to control erosion be deposited.

A variety of shredding devices have been designed to shred baled and unbaled mulch material. Some of these devices, such as the device disclosed by Cross in U.S. Pat. No. 2,685,900, employ a plurality of shredding wheels and tines to break up the material. This device employs a plurality of shredder shafts to break up the material and is inherently complex. Furthermore, the device can only apply shredded material to a single furrow.

Other devices, such as the device disclosed by Reinecker et al. in U.S. Pat. No. 3,015,188, employ a two-stage shredding and applying mechanism to shred and distribute the material. Such devices cannot necessarily assure a uniform distribution of the mulch material.

Thus, a need exists for a simple device which can shred and apply baled mulched material, from bales, uniformly to a plurality of furrows.

DISCLOSURE OF THE INVENTION

It is an object of the invention to apply a uniform layer of mulch material to a plurality of furrows between rows of growing plants on cultivated land.

It is also an object of the invention to provide a device which can apply a uniform layer of mulch material to furrows between rows of growing plants from baled material.

It is yet another object of the invention to provide a device which applies a uniform layer of mulch material from bales to a plurality of furrows and which has a minimum number of moving parts.

The invention achieves these objectives by providing a baled mulch applicator having a plurality of bale chambers which have a relative distance from one another which corresponds to the distance between furrows in a cultivated field. The invention also has a single rotating shredder shaft per bale chamber and corresponding advancing means within the bale chamber to advance sized bales towards beaters on the rotating shredder shaft. The ratio of the linear velocity of the tips of the beaters and the rate of advance of baled material within the bale chamber is carefully selected so that the bales are broken up uniformly and distributed into the furrows.

In one embodiment, a plurality of beaters each having a plurality of arms are perpendicularly mounted to the shredder shaft. Each arm has a curved leading edge which is jagged or serrated. The beaters are mounted on the shredder shaft in a staggered fashion to more uniformly distribute loads placed on the shredder shaft by the beaters. Staggering the beaters also promotes a more uniform distribution of the material. The beaters are oriented so that the curved leading edges of the arms strike the advancing bales in the bale chamber. The leading edges of the arms are jagged to grab at the surface of the bale as it advances towards the beaters.

Upper and lower drag chains, or other means, are provided in the bale chamber to advance the bales towards the beaters. The upper drag chain can be hinged to facilitate loading the bale chamber with bales. It is highly preferred to adapt the dimensions of the bale chambers to correspond to those of the bales so that the bales will be directed through the bale chamber to the beaters by the drag chains.

The linear velocity of the tips of the beaters and the rate at which the drag chains or other means advance the bales is carefully selected to assure a uniform distribution of the bale material without bunching. Typically, bales are formed in layers or slugs, and it is highly preferred to break up the slugs to achieve a uniform distribution. The combination of the shape, orientation and design of the beaters, along with their rotational speed and the advancing speed of bales towards the beaters, is extremely important in assuring a uniform distribution of the material.

A deflector hood may be provided at the end of the bale chamber near the shredder shaft to direct shredded material around and over the beaters and downward into the furrows.

The baled mulch applicator can be provided with means for adjusting the relative distance between bale chambers to correspond to furrows distances in various cultivated fields.

Alternatively, a single bale chamber, with a single beater or a plurality of beaters, can be provided if it is only desired that one furrow should be treated with shredded material.

Provisions are made for driving the various moving components of the baled mulch applicator from a tractor, including hydraulic or mechanical connections.

BRIEF DESCRIPTION OF THE DRAWINGS

FIG. 3 is a side elevational view of a bale chamber with portions of the side cut away.

FIG. 4 is a side elevational view of a bale chamber looking generally in the direction of arrows 4—4 of FIG. 2.

BEST MODE FOR CARRYING OUT THE INVENTION.

Figure 1:
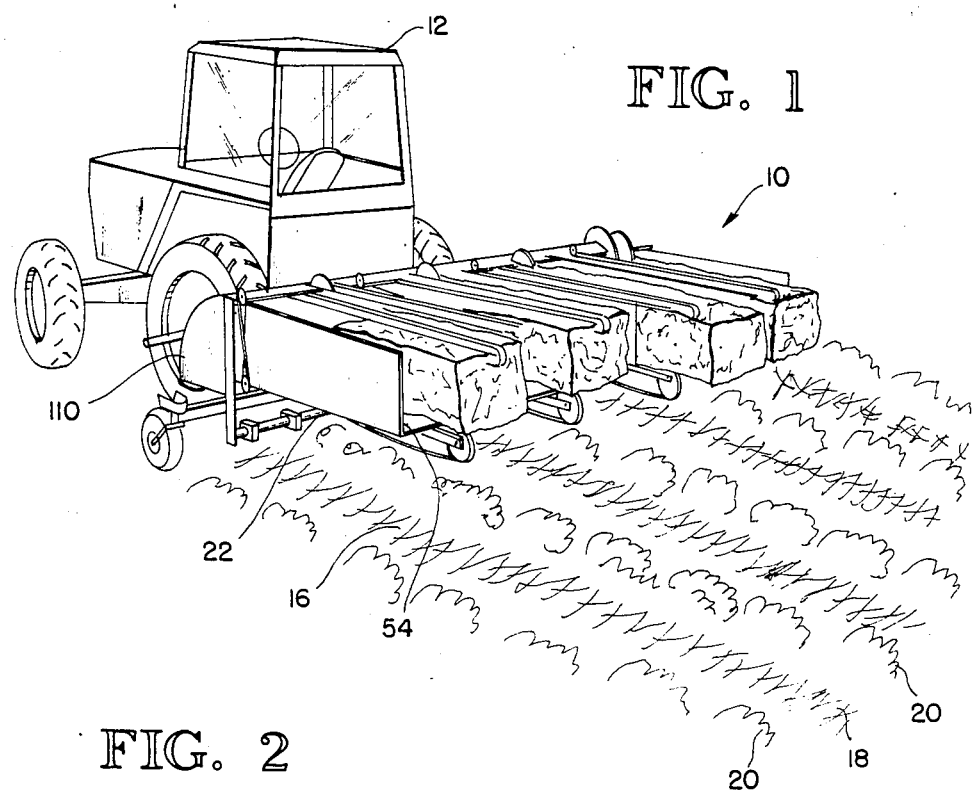
FIG. 1 is a perspective view of the baled mulch applicator, including a plurality of bale chambers, in use with a tractor.

In FIG. 1, a baled mulch applicator, or mulch applicator, in accordance with the present invention, is generally indicated at reference numeral 10. The mulch applicator is shown in use with a farm tractor 12. The mulch applicator can reduce baled plant or mulch material to a form suitable to apply to the furrows 18 between the rows 20 of a cultivated field. The application of shredded material with this mulch applicator to furrows in cultivated land significantly reduces soil erosion and increases water absorption thereby increasing yield.

Figure 2:
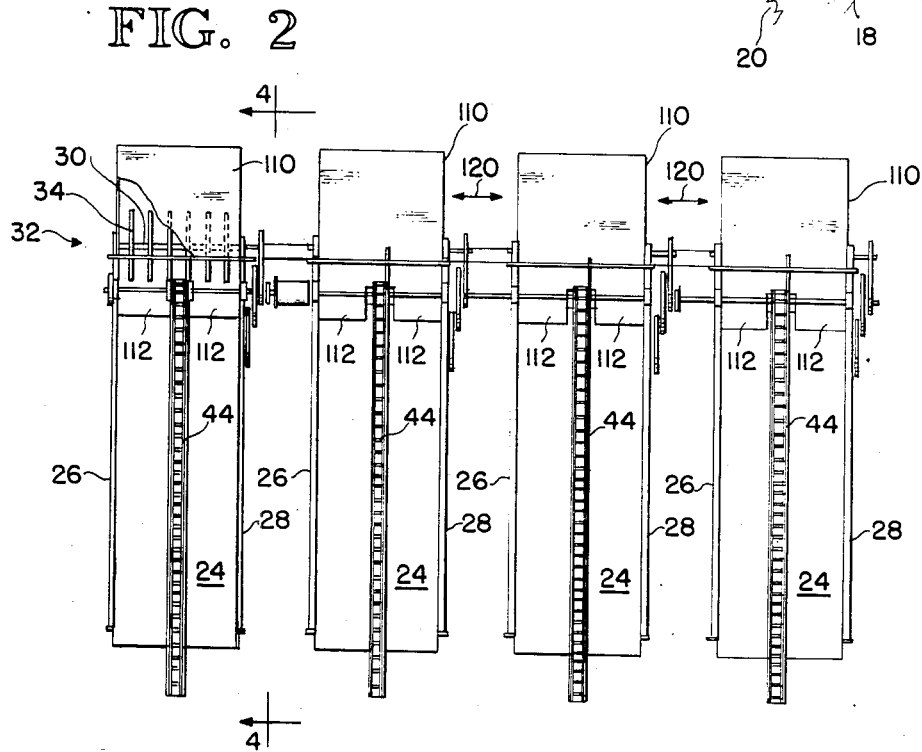
FIG. 2 is a top plan view of the invention, with a portion of a deflector hood cut away.

The mulch applicator 10 has a series of bale chambers 22 which align with the furrows. Although four chambers are shown, more or fewer can be used. As seen in FIG. 2, the bale chambers are elongated, and, as seen in FIG. 1, they are dimensioned so as to accept baled material 14. A bale chamber has an enclosing bottom 24, a left side wall 26, and a right side wall 28. The bale chamber is preferably made from 16-gauge sheet steel. It is preferred that the bottom have a length of 60 inches and a width of 20 inches. The left and right side walls are substantially coextensive with the bottom, and preferably have a height of approximately 18 inches. Any other height can be used for the sides, provided that the height is sufficient to contain a typical bale within the bale chamber. The dimensions of the bale chambers are simply selected to confine and guide the bale in the bale chamber.

Figure 5:
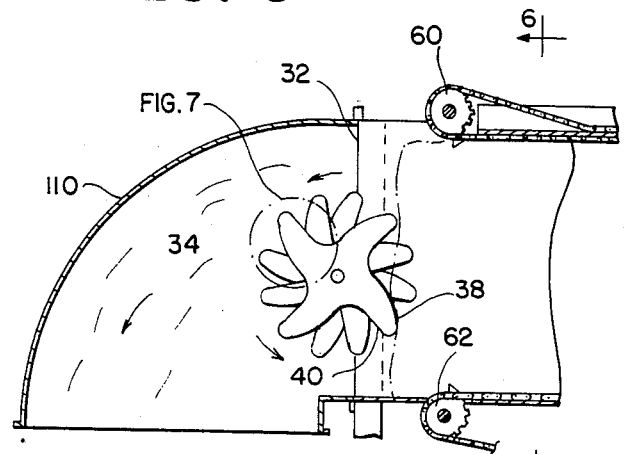
FIG. 5 is a sectional side elevational view of a bale chamber illustrating the orientation and rotation of the beaters.
Figure 7:
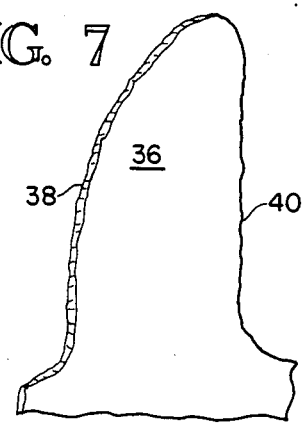
FIG. 7 is an enlarged sectional isometric view of circled area 7 of FIG. 6 illustrating the jagged leading edge of the beaters.
Figure 6:
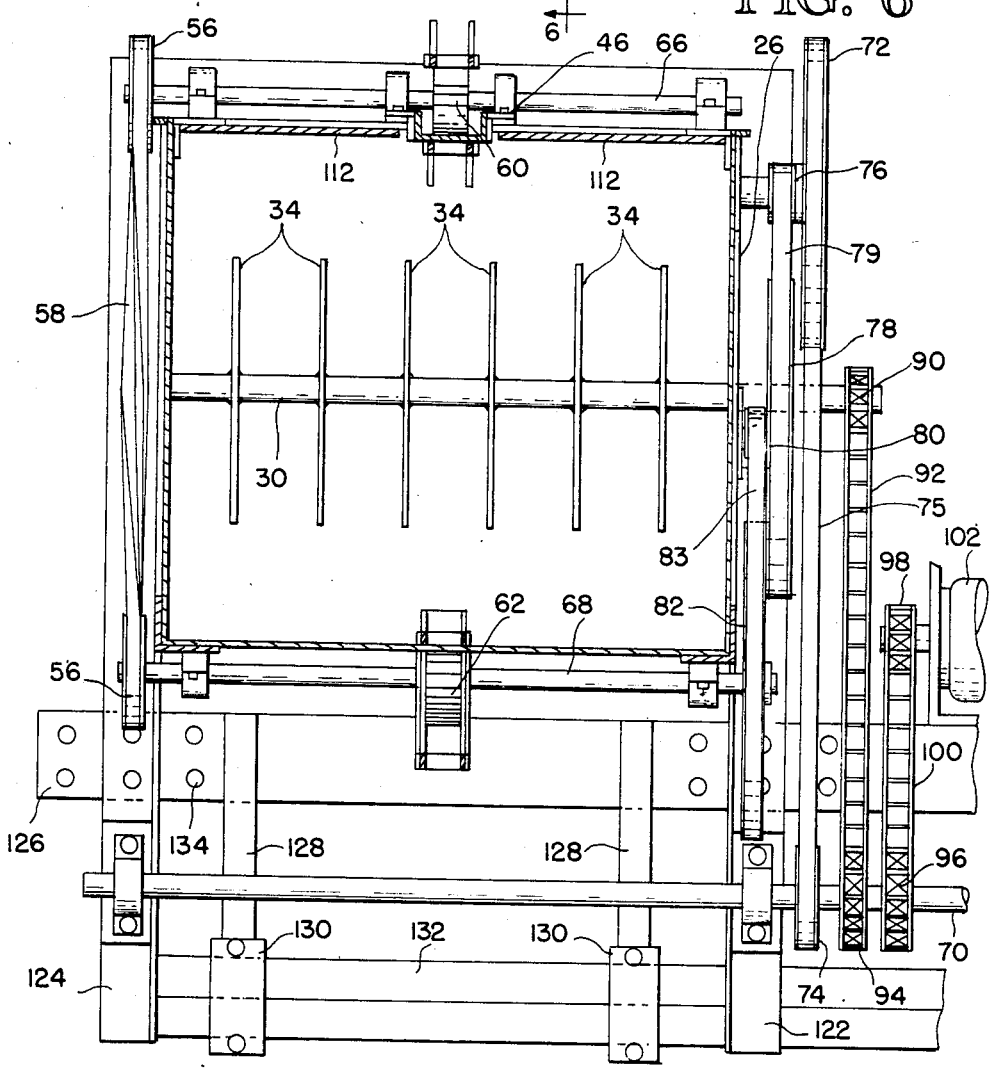
FIG. 6 is a sectional rear elevational view of a bale chamber looking generally in the direction of arrows 6—6 of FIG. 5.

The mulch applicator includes a mechanism for disintegrating the baled material. As seen in FIGS. 2 and 6, a shredder shaft 30 is rotatably mounted across the forward end 32 of the bale chabmer 22. the shredder shaft is mounted horizontally between the side walls and preferably bisects the bale chamber. A plurality of beaters 34 are secured, such as by welding, to the shredder shaft to rotate with the shredder shaft. As seen in FIGS. 3, 5 and 7, the beaters have four arms 36 extending radially from the hub or center. More or fewer arms can be used but four are preferred. Each arm has a leading edge, such as the curved side 38, and a trailing edge, such as a straight side 40. The shape of the leading edge is important; the shape of the trailing edge is not. The beaters are mounted on the shredder shaft so that, as the shredder shaft rotates, the curved side of the beater will strike the bale 14. As seen in FIG. 7, the beaters are formed such that the curved side is jagged or serrated to snag portions of the bale and to break up the bale. The jagged edge can be formed by hand cutting the beaters from sheet stock with a torch. The curved side of each arm has a gentle curve near the center or hub of the beater which progresses to a very sharp curve near the top of each arm.

In the preferred embodiment, six beaters 34 are mounted on the shredder shaft associated with a single bale chamber. The beaters are perpendicular to the axis of the shaft and are spread approximately 3⅝ inches apart along the shaft. The beaters preferably have a maximum diameter of 11 3/16 inches. The arms of the adjacent beaters are staggered on the shredder shaft, as shown in FIGS. 3 and 5, to help reduce bunching of the baled material 14 as the material is shredded and to provide a more uniform loading on the shredder shaft as the shredder shaft rotates.

As seen in FIGS. 3 through 6, the mulch applicator 10 is provided with a mechanism for advancing bales toward the beaters, such as a lower drag chain 42 and a hinged upper drag chain 44. These chains work cooperatively to advance baled material 14 towards the beaters 34 in a uniform fashion. As shown in FIG. 6, the hinged upper drag chain can pivot about a hinge portion 46 to allow the upper drag chain to swing up and away from the bale chamber 22 to facilitate loading of baled material into the bale chamber. A latch 47 is provided on the hinge portion to hold the upper drag chain in the up or open position. The bales must be unbound subsequent to loading the bales in the bale chamber and after lowering the upper drag chain to allow the beaters to operate properly. Each chain is provided at spaced intervals with grab links 48 to assist the hinged upper drag chain 44 and the lower drag chain 42 in advancing the baled material 14 towards the forward end 32 of the bale chamber 22. Preferably, the upper and lower drag chains are positioned in a plane which longitudinally bisects the bottom 24 of the bale chamber 22. It is highly preferred to position the hinged portion 46 approximately 18 inches above the lower drag chain so that when a typical bale is inserted in the bale chamber and on top of the lower drag chain, the hinged upper drag chain will rest on top of the bale in a position which is approximately parallel to the lower drag chain 42. This configuration is shown in FIG. 1. In the preferred embodiment, the drag chains are constructed from No. 55 flat steel chain having grab links 48 every eighth link of the chain. As shown in FIGS. 3 and 4, the hinged upper drag chain is provided with a chain guide 50, in the form of a U-shaped channel, to support the upper run of the hinged upper drag chain and to hold the lower run of the upper drag chain against the top of a bale in the chamber. The upper run of the lower drag chain 42 is supported by the bottom 24 of the bale chamber 22. The upper and lower drag chains are provided with tail rollers 52 to provide a rotating support for the chains at the trailing end 54 of the mulch applicator 10. As seen in FIGS. 5 and 6, the upper and lower drag chains are driven by an upper chain head sprocket 60 and a lower chain head sprocket 62, respectively. The head sprockets are mounted on an upper chain drive shaft 66 and a lower chain drive shaft 68, respectively. These shafts are interconnected so that the lower run of the upper chain and the upper run of the lower chain move in the same direction and at the same rate, such as by the use of pulleys 56 and a twisted belt 58. The chain guide 50 is connected to the hinged portion 46 below the axis of the upper chain drive shaft 66.

In the preferred embodiment, the pulleys 56 are 4¾ V-belt pulleys and the upper and lower head sprockets are 7-tooth, No. 55 flat steel chain sprockets.

The lower chain shaft 68 is rotationally driven, such as by a main drive shaft 70, through a series of reduction pulleys. The main drive shaft 70 extends across the mulch applicator. As seen in FIG. 6, in one embodiment these reduction pulleys reduce the angular speed delivered to the lower chain shaft 68 from the main drive shaft 70 by a factor of 100:1. A suitable arrangement of reduction pulleys can be as follows. A first reduction pulley 72 having a pitch diameter of 11½ inches is connected to a drive pulley 74 on the main drive shaft 70 by a drive belt 75. The first reduction pulley 72 is mounted for rotation with a first step pulley 76 having a pitch diameter of approximately 2 inches. The first reduction pulley and the first step pulley are coaxially mounted on the right side 28 of the bale chamber 22. The first step pulley 76 is connected to a second reduction pulley 78 by a first reduction belt 79. The second reduction pulley has a diameter equal to that of the first reduction pulley. The second reduction pulley 78 is coaxially mounted with a second step pulley 80 or rotation together. The second step pulley has a diameter equal to that of the first step pulley. The second step pulley 80 is connected to a third reduction pulley 82 by a second reduction belt 83. The third reduction pulley 82 has a diameter equal to that for the second and first reduction pulleys. The third reduction pulley is then fixedly attached to the lower chain drive shaft 68, which causes simultaneous movement of both the lower drag chain 42 and the hinged upper drag chain 44 through the twisted belt 58. This configuration of reduction and step pulleys provides for a reduction ratio from the main drive shaft 70 to the lower chain drive shaft 68 and upper chain drive shaft 66 of approximately 100:1. Other configurations for reducing the rotational speed of the chain shafts relative to the main drive shaft are also suitable. It is preferred to use belts in the reduction system to provide for some slippage in the drive train.

The shredder shaft 30 is also driven off the main drive shaft 70. The shredder shaft has a shredder shaft drive sprocket 90 fixedly attached at one end thereto. Sufficient clearance is provided between the shredder shaft drive sprocket 90 and the pulley reduction system to allow for the proper operation of these components. The shredder shaft drive sprocket is connected by a shredder shaft drive chain 92 to a shredder shaft drive train sprocket 94, which is fixedly attached to the main drive shaft 70. The main drive shaft 70 also has a main drive sprocket 96, which is attached to a motor sprocket 98 by a main drive chain 100. In the preferred embodiment, the shredder shaft drive sprocket 90 is a 12-tooth, No. 50 roller chain sprocket; the shredder shaft drive chain 92 is a No. 50 roller chain; and both the shredder shaft drive train sprocket 94 and the coaxial main drive sprocket 96 are 20-tooth sprockets.

A driving mechanism, such as hydraulic motor 102 powered from the tractor 12, rotates the motor sprocket 98 at approximately 125 revolutions per minute (rpm). This causes the shredder shaft 30 to also rotate at approximately 125 rpm. The pulley reduction system will therefore cause the lower chain shaft 68, and thus the upper chain-driving sprocket 60 and the lower chain-driving sprocket 62, to rotate at approximately 1.25 rpm, which advances the drag chains at approximately 0.5 ft/min. Thus, the beaters 34, which are attached to shredder shaft 30, rotate relatively rapidly, while the lower drag chain 42 and the hinged upper drag chain 44 advance the baled material 14 relatively slowly towards the beaters.

The relative rate of rotation of the beaters 34, and hence the linear velocity of the tips thereof, and the rate at which the bales are advanced by the drag chains 42 44 are extremely important in assuring a uniform distribution of the material 16. In the preferred embodiment, the beaters have a maximum diameter (tip to tip) of 11 3/16 inches and the shredder shaft 30 has a rotational speed of approximately 125 rpm. This corresponds to a linear tip velocity of approximately 375 feet per minute (375 ft/min). The drag chains advance the bales at approximately 0.5 ft/min. It is highly preferred, therefore, that the ratio of linear tip velocity to drag chain advance be approximately 750:1. This ratio encourages the disintegration of each compacted slug portion and deposits the material 16 uniformly in the furrows 18. It has been discovered that a linear tip velocity which is too slow relative to the drag chain advance causes the beaters to grab too much material, resulting in a bunching of the material and a non-uniform distribution in the furrows.

The discharge exit of each bale chamber 22 is provided with a deflector hood 110. The deflector hood is mounted at the forward end 32 of the bale chamber 22 and has a smoothly curved top wall to direct the shredded material 16 towards the ground. The deflector has a downwardly directed discharge opening. The deflector hood is dimensioned so that rotation of the beaters 34 will cause the curved side 38 of the arms 36 to strike the bale 14 and lift a portion of the bale material over and around the beaters and into the deflector hood for distribution to the furrows 18 between the rows 20 of cultivated soil. The deflector hood is also provided with two extension plates 112 which guide the bales into the deflector hood and prevent the bales from moving upwardly around the upper drag chain due to the upward component of force from the beaters 34. The extension plates, as seen in FIGS. 2 and 6, extend inwardly towards the trailing end of the bale chamber from the forward end 32 of the bale chamber at the top of the deflector hood. The extension plates straddle the hinged upper drag chain so as not to interfere with the operation thereof.

As shown in FIGS. 1 and 2, the bale chambers 22 are spaced a distance 120 apart from one another to correspond to the distance between furrows in between the rows of plants. The distance between the bale chambers is adjustable so that the mulch applicator 10 can be used to apply material 16 to different fields having variously spaced furrows 18. As shown in FIG. 6, the bale chamber has a right upright 122 and a left upright 124 which support the bale chamber from a horizontal frame member 126. The horizontal frame member is welded or connected to vertical struts 128 which support the horizontal frame member from conventional cultivator clamps 130. The clamps are adapted to engage with a conventional cultivator tool bar 132 which is typically supported by the tractor 12. The horizontal frame member 126 has a plurality of spaced mounting holes 134. The mounting holes correspond to similar holes on the uprights 122, 124 and provide for horizontal adjustment of the bale chambers in the horizontal frame member. Thus, the distance between individual bale chambers can be adjusted to correspond to the distance between furrows in a given field. The drive pulley 74 and the shredder shaft drive train sprocket 94 are slidably engaged with the main drive shaft 70 to allow for the operation of the various pulleys as the distance between bale chambers is adjusted.

Although the mulch applicator 10 is shown connected to the cultivator tool bar 132 of a farm tractor 12, the mulch applicator could be designed for self-locomotion.

The mulch applicator 10 constructed in this manner provides an efficient and economical mechanism for applying material to furrows which is known to significantly reduce the velocity of water flowing in the furrows, thereby greatly reducing soil erosion and allowing time for absorption of water and thus efficient use of available water.

The baled mulch applicator may be utilized to apply materials such as straw, hay, grass or other types of mulch material packaged in baled form.

It will be appreciated that other variations and embodiments of the invention as disclosed are also contemplated. Therefore, the invention is not to be limited to the above description but is to be determined by the scope of the claims which follow.

What is claimed is:

1. A baled mulch applicator for use in removing baled mulch material from the bale and for applying such material in rows to a field to reduce soil erosion, promote water absorption and increase crop yield, comprising:
   (a) at least one bale chamber for receiving a bale of mulch material having a bottom and upstanding side walls positioned to closely receive and positively position a bale between them;
   (b) a shaft mounted for rotation about a substantially horizontal longitudinal axis between the bale chamber side walls;
   (c) at least one beater, mounted on the shaft for rotation therewith, having a central hub and a plurality of arms radially extending from the hub, each arm having means for pulling material from the positively positioned bale and for moving the material so that the pulled material is removed from the bale, including a convexly curved, leading edge oriented so that the leading edges are directed upwardly when in contact with a received bale;
   (d) means for uniformly advancing the baled mulch in the bale chamber toward the beater and for maintaining the integrity of the advancing bale; and
   (e) means for rotating the shaft so that the leading edges of the beater arms strike an advancing bale in an upwardly direction to remove material from the bale and for deposition of the material in a row.

2. The baled mulch applicator as claimed in claim 1 wherein the curved, leading edge of each arm is jagged and wherein the arms are coplanar and substantially perpendicular to the axis of the shaft.

3. The baled mulch applicator as claimed in claim 2, including a plurality of beaters mounted on the shaft and wherein the shaft is vertically centered at one end of the bale chamber.

4. The baled mulch applicator as claimed in claim 3 wherein the beaters are staggered on the shaft to promote uniform loading on the shaft as the shaft rotates.

5. The baled mulch applicator as claimed in claim 1 wherein the baled mulch advancing means are a pair of cooperating upper and lower drag chains.

6. The baled mulch applicator as claimed in claim 5, including a deflector hood to direct the removed material over and around the shaft and downwardly to rows of a field and also including means for directing the material into the hood against the tendency of the material to move upwardly around the upper drag chain due to the action of the beater against the advancing bale.

7. The baled mulch applicator as claimed in claim 6 wherein the upper drag chain is hinged to open away from the bale chamber so that loading the bale chamber with a bale is facilitated.

8. The baled mulch applicator as claimed in claim 7, including a latch to hold the hinged upper drag chain in the open position.

9. The baled mulch applicator as claimed in claim 1 including means for causing the ratio of the linear velocity of the tips of the arms to the linear velocity of the baled mulch advancing means to be approximately 750:1.

10. A baled mulch applicator for use in removing baled mulch material and applying such material in rows to a field to reduce soil erosion, promote water absorption and increase crop yield, comprising:
   (a) a plurality of spaced, parallel bale chambers having means for adjusting the relative distance therebetween for receiving a bale of mulch material having a bottom and upstanding side walls positioned to closely receive a bale between them;
   (b) a shaft mounted for rotation about its longitudinal axis between the bale chamber side walls;
   (c) at least one beater, mounted on the shaft for rotation therewith, having a central hub and a plurality of arms radially extending from the hub, each arm having a convexly curved, jagged leading edge for removing material from the bale and oriented so that the leading edges are directed upwardly when in contact with a received bale;
   (d) means for advancing the baled mulch in the bale chamber toward the beater and for maintaining the integrity of the advancing bales; and
   (e) means for rotating the shredder shaft in the direction of the beater arm leading edges.

* * * * *